United States Patent
Furuhata et al.

[11] 3,832,033
[45] Aug. 27, 1974

[54] REGULAR FERROELECTRICS-LIQUID CRYSTAL COMPOSITE OPTICAL ELEMENT

[75] Inventors: Yoshio Furuhata, Tokyo; Kazuhisa Toriyama, Hitachi, both of Japan

[73] Assignee: Hitachi, Ltd., Tokyo, Japan

[22] Filed: Dec. 18, 1972

[21] Appl. No.: 315,782

[30] Foreign Application Priority Data
Dec. 17, 1971   Japan.............................. 46-101898

[52] U.S. Cl............ 350/160 LC, 250/331, 350/150
[51] Int. Cl.............................................. G02f 1/16
[58] Field of Search....... 350/150, 160 LC; 250/331

[56] References Cited
UNITED STATES PATENTS

| | | | |
|---|---|---|---|
| 3,652,148 | 3/1972 | Wysocki et al. | 350/150 |
| 3,702,724 | 11/1972 | Land et al. | 350/150 X |
| 3,725,899 | 4/1973 | Greubel | 340/324 M |
| 3,732,429 | 5/1973 | Braunstein et al. | 350/160 LC X |

*Primary Examiner*—Edward S. Bauer
*Attorney, Agent, or Firm*—Craig & Antonelli

[57] ABSTRACT

This invention relates to a regular ferroelectric-liquid crystal composite optical element characterized in that a film of a cholesteric liquid crystal or a nematic liquid crystal with negative dielectric anisotropy is interposedly provided on the surface of a regular ferroelectric single crystal substrate.

17 Claims, 6 Drawing Figures

REGULAR FERROELECTRICS-LIQUID CRYSTAL COMPOSITE OPTICAL ELEMENT

BACKGROUND OF THE INVENTION

The present invention relates to a novel optical element comprising, in combination, a regular ferroelectric substance and a liquid crystal.

DESCRIPTION OF THE PRIOR ART

As is well known, ferroelectrics can be broadly classified on the basis of physical properties into (1) irregular ferroelectrics and (2) regular ferroelectrics.

The irregular ferroelectrics (1) are ferroelectric substances which have no center of symmetry in the paraelectric phase. In the ferroelectric phase, changes ($\pm x_s$) of lattice deformation ($x$) attendant upon the reversal of polarization are shown by applying electric fields E to them as illustrated in FIG. 1a. From a different viewpoint, they can also be said to be ferroelectric substances which can have the spontaneous polarization reversed ($+P_s \rightleftarrows -P_s$) by stresses (X) as illustrated in FIG. 1b. One of the properties exhibited by the group of substances is the spontaneous Pockels effect. It is an effect in which the spontaneous birefringence $\Delta n_s$ of the ferroelectric phase is proportional to the spontaneous polarization $P_s$ as in the following equation (1):

$$\Delta n_s = a \cdot P_s \quad (1)$$

In other words, it is an effect in which the sign of the birefringence $\Delta n_s$ is changed in conformity with the sign of the spontaneous polarization. More specifically, the spontaneous birefringence $\Delta n_s$ can be changed from plus to minus or from minus to plus in such way that, as illustrated in FIG. 1c, the electric fields E or stresses X are applied to the ferroelectric phase. Such a physical phenomenon is termed the spontaneous Pockels effect. Proposals have been made to constitute optical elements, such as an optical shutter, a color modulator and an optical spacial modulator, by utilizing this phenomenon. The intended uses are generally common to the irregular ferroelectrics. As typical substances belonging to the group of irregular ferroelectrics, there are known gadolinium molybdate and its isomorphous crystals. In addition, there are known approximately 20 kinds such as KDP (potassium dihydrogen phosphate) and its isomorphous substances, Rochelle salt and its isomorphous substances, MASD (methyl ammonium aluminum sulfate dodecahydrate), boracite, and di-ammonium di-cadmium sulfate $(NH_4)_2 Cd_2(SO_4)_3$. Among these irregular ferroelectrics, those which can be put into practical use at the room temperature are restricted to gadolinium molybdate and its isomorphous crystals.

In contrast, the regular ferroelectric substances, which have centers of symmetry in the paraelectric phase, are a group of substances in which, even if the spontaneous polarization is reversed, no change occurs in the lattice deformation. One of their properties is to have the spontaneous Kerr effect. More specifically, the spontaneous birefringence $\Delta n_s$ is proportional to the square of the spontaneous polarization $P_s$ as in the following equation (2):

$$\Delta n_s = b \, P_s^2 \quad (2)$$

Accordingly, even when the spontaneous polarization is reversed by electric fields, apparently the birefringence undergoes no substantial change. In other words, it is impossible to optically read out the change of the polarization.

This is an essentially different point of the regular ferroelectrics from the irregular ferroelectrics. Consequently, as compared with the irregular ferroelectric substances, the regular ferroelectric substances are remarkably lower in utility value as materials for electro-optical devices. As the substances belonging to the group of regular ferroelectrics, there are known as many as approximately 200 kinds such as a series of oxygen-octahedral ferroelectrics (for example, barium titanate $BaTiO_3$ and lithium niobate $LiNbO_3$), GASH (guanidine aluminum sulfate hexahydrate), TGS (triglycine sulfate), and ammonium sulfate. As described above, however, the substances belonging to the group of regular ferroelectrics do not change the birefringence at all even at the reversal of the spontaneous polarization. They have, therefore, been regarded as hardly having a utility value for the material of optical elements.

SUMMARY OF THE INVENTION

The inventors have found out that the regular ferroelectrics which have been considered to be optically valueless can bear an excellent function optically equivalent to the irregular ferroelectrics by combining the regular ferroelectric substance with a liquid crystal.

The novel regular ferroelectrics-liquid crystal composite optical element of the present invention has been accomplished on the basis of the above experimental fact, and is characterized in that a cholesteric liquid crystal or a nematic liquid crystal with negative dielectric anisotropy is interposed between a regular ferroelectric single crystal and a transparent plate.

As the regular ferroelectric crystal, any one can be selected for use from among a number of already known crystals (at present, approximately 200 kinds are known) which include, for example, barium titanate $BaTiO_3$, lithium niobate ($LiNbO_3$), GASH and TGS as previously stated.

At present, approximately 3,000 kinds of liquid crystals are known. Among them, cholesteric liquid crystals or nematic liquid crystals with negative dielectric anisotropy are employed in the present invention as referred to in the above.

As the cholesteric liquid crystals, there can be mentioned, for example, cholesteryl nonanoate, cholesteryl oleate, cholesteryl acetate, cholesteryl choloride, cholesteryl propionate, cholesteryl oleyl carbonate, cholesteryl methallyl carbonate, cholesteryl benzoate, cholesteryl 4-nitrobenzoate, cholesteryl nitrate, etc.

As the nematic liquid crystals with negative dielectric anisotropy, there can be mentioned, for example, p-azoxy anisole, anisylidene-p-aminophenyl acetate, p-azoxy phenetole, 4,4'-di-ethoxy diphenyl, 4,4'-di-n-amyloxy diphenyl, 4,4'-n-hexyloxy diphenyl, 4'-methoxybenzylidene aminostilbene, 4'-methoxybenzylidene aminobenzonitrile, 4'-methoxybenzylidene aminoazobenzene, 4-(4'- methoxybenzylidene) aminodiphenyl, n-(p-methoxybenzylidene)-p-n-butylaniline, etc.

The feature of the cholesteric liquid crystals resides in that, when an electric field is applied, the helical twist of the overall molecular configuration alters, to change the wavelength of selective scattering. Accordingly, in case where the cholesteric liquid crystal is combined with the regular ferroelectrics single crystal substrate, light scattering can be observed which has a wavelength corresponding to the quantity of charges induced on the surface of the substrate. On the other hand, the nematic liquid crystal with negative dielectric anisotropy signifies one in which the dipole moment is substantially perpendicular to the major axis of the molecule. The feature of the liquid crystal resides in that, when an electric field is applied, the light transmittance is abruptly lowered. Accordingly, in the case where the nematic liquid crystal is combined with the regular ferroelectric substance substrate, light transmittance corresponding to the quantity of charges induced on the surface of the substrate can be observed.

As described above, in accordance with the present invention the polarized state of the regular ferroelectric can be easily detected optically by utilizing the characteristics of the liquid crystal versus the electric field. It can, accordingly, be said that the composite element of the present invention has substantially the same function and effect as those of the irregular ferroelectrics in the optical sense. It has been revealed that the relation between the birefringence $\Delta n$ and the electric field E in the composite element of the present invention is similar to that in the irregular ferroelectrics as illustrated in FIG. 1c.

As is well known, the domain state of the regular ferroelectrics cannot be directly observed optically. This is apparent from Equation (2) previously mentioned. In the case of the composite element of the present invention, however, the polarized state of the regular ferroelectric substance can be optically observed through a liquid crystal film.

Advantages of the composite element of the present invention when compared with irregular ferroelectrics such as gadolinium molybdate, are listed in Table 1.

TABLE I

| Items | Irregular Ferroelectric | Composite Element of the Invention |
| --- | --- | --- |
| Kind | Slight (approx. 20 kinds) | Various; Regular ferroelectrics ... approx. 200 kinds, Liquid crystal ... approx. 3,000 kinds |
| Price | Comparatively high | Can be made cheaply |
| Switching Speed | Above 10 m/sec. | Possible to about 1 m/sec. |
| Splitting Voltage | Comparatively high (approx. 5KV/cm) | Low (from approx. 0.2KV/cm) |
| Resolution | Although high, an arbitrary pattern is not allowed | 500 lines/inch, and an arbitrary pattern is allowed |
| Storage Time | ∞ | ∞ |

Figure 1A:
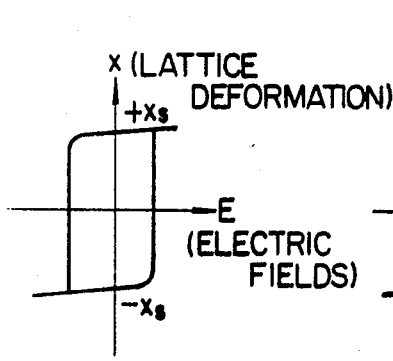
FIG. 1a is a curve diagram showing the relation between the electric field and the lattice deformation of irregular ferroelectrics.
Figure 1B:
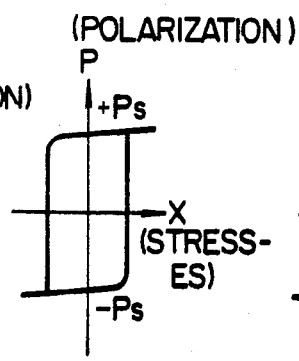
FIG. 1b shows the relation between the stress and the spontaneous polarization of the same.
Figure 1C:
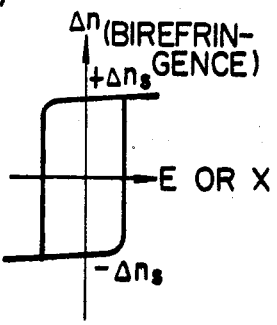
FIG. 1c shows the relation between the electric field or stress and the birefringence of the same.
Figure 2:
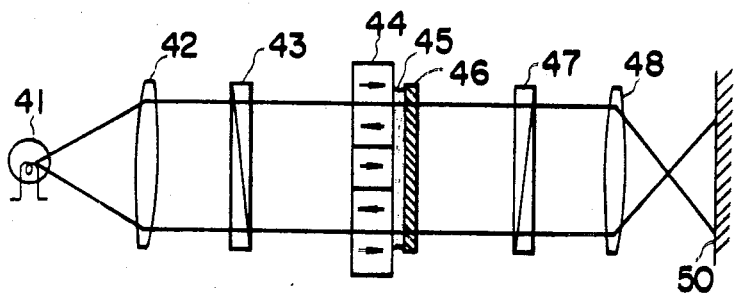
FIG. 2 depicts an arrangement of a device for measuring the polarized state of a regular ferroelectric substance.
Figure 3:
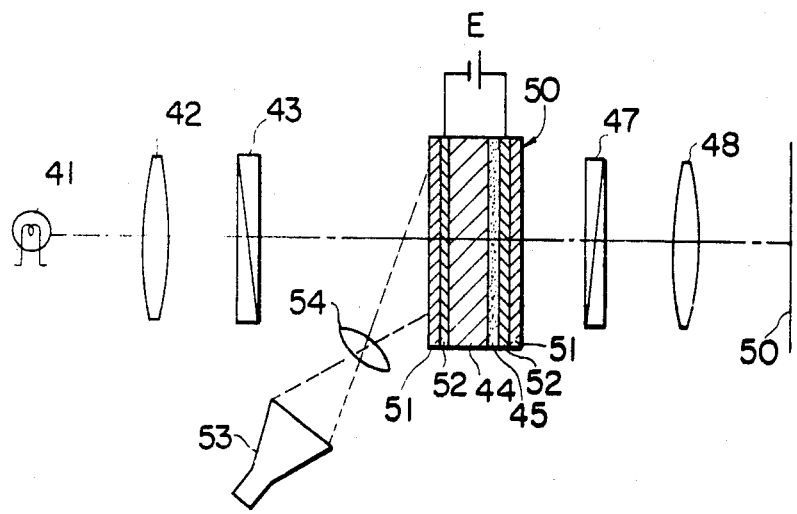
FIGS. 3 and 4 are schematic views of information recording and reproducing devices, each view showing an embodiment of the present invention.
Figure 4:
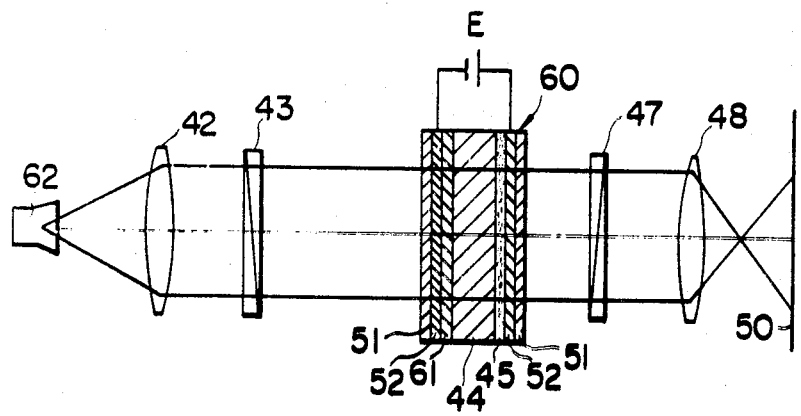

In each of the FIGS. 2–4, the following reference characters designate the same listed parts:
41: light source,
42: lens,
43: polarizer,
44: regular ferroelectric single crystal substrate,
45: liquid crystal,
46: slide glass,
47: analyzer,
48: lens,
50: storage medium,
51: glass plate,
52: transparent electrode,
53: means to write information with thermal image,
54: lens,
61: transparent photoconductor, and
62: means to write information with optical image.

DESCRIPTION OF THE PREFERRED EMBODIMENTS

FIG. 2 shows an arrangement of an apparatus for measuring the polarized state of a regular ferroelectric substance. A regular ferroelectric single crystal substrate 44 having a domain structure is depicted by arrows. The space between the substrate 44 and a slide glass 46 is filled with a film 45. The film 45 is a liquid crystal.

Thus, a composite element is completed as illustrated in the figure. The element is located between two polarizing plates 43 and 47. Numeral 41 indicates a light source, while numerals 42 and 48 are lenses, respectively. With such a construction, electric fields responsive to the domain distribution of the substrate 44 are applied to the liquid crystal film 45.

In the measuring apparatus of the above construction, as the regular ferroelectrics, two kinds of TGS and lithium hydrogen selenite ($LiH_3(SeO_3)_2$) were selected from among approximately 200 kinds. As the liquid crytals, anisylidene-p-aminophenyl acetate

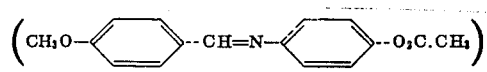

was selected as the nematic liquid crystal with negative dielectric anisotropy, and cholesteryl oleate as the cholesteric liquid crystal from among approximately 3,000 kinds. Then, the polarized states of the above-mentioned ferroelectric substances could be observed in the form of differences in the birefringence of the liquid crystal films. In particular, in the case of using the cholesteric liquid crystal, it was recognized that the domain structures of the ferroelectric can be sufficiently discriminated in the form of differences in color.

While the foregoing is a static measurement, a dynamic phenomenon could also be observed as discussed below.

On the TGS single crystal subjected to poling in the positive direction, a nematic liquid crystal was coated. The single crystal, coated with the liquid crystal, was held between glass plates, each being circularly provided with a transparent electrode. An electric field in the negative direction (−12 volts) was applied. Then, it was observed that a negative domain was generated in TGS, and that it grew along the plane of the single crystal substrate to finally occupying the whole area across the electrodes into the negative domain. Although the moving speed of a domain wall was very slow (approximately 1 cm/min), the liquid crystal was observed to perfectly follow it.

There will now be described another example of application of the composite element of the present invention.

Since, as previously stated, the composite element of the present invention has substantially the same function and effect as those of the irregular ferroelectrics, its applications to a memory device, an optical switch, a color modulating device, etc., are possible. In addition, the composite element of the invention is effective as a memory type display and an eraseable optical storage medium.

The examples of application as the eraseable optical storage media will be mentioned hereunder.

EXAMPLE 1

FIG. 3 shows a device in which, when information is provided in the form of a thermal image, the ferroelectric is heated in order to lower the coercive field $E_c$, so that the information can be written. A part shown at 50 in the figure corresponds to the storage medium into which the composite element of the present invention is incorporated. Adjacent to a regular ferroelectric single crystal substrate 44, a liquid crystal film 45 is formed. The substrate with the liquid crystal film formed thereon is held between glass plates 51, each of which is provided with a transparent electrode 52. Thus, the storage medium is so constructed that a very small writing field $E_w$, lower than coercive field at room temperature, is applied across the electrodes. On the other hand, numeral 53 indicates means to write information with a thermal image, and 54 a condensing lens therefor. Parts 41, 42, 43, 47 and 48 constitute an optical system for reading out information, and constitute a light source 41, a lens 42 a polarizer 43, an analyzer 47 and a lens 48 respectively. Now, the substrate 44 is brought into unidirectional domains in a direction opposite to the writing field $E_w$, and a thermal image is applied to the substrate 44 by the information writing means 53. Then, domains at parts at which the coercive field $E_c$ becomes lower than the writing field $E_w$ due to the thermal image are reversed to the direction of the writing field $E_w$. An optical image corresponding to the thermal image is, therefore, produced.

EXAMPLE 2

If a thin film of a transparent photoconductor such as cadmium sulfide (Cds) and polyvinyl carbazale (PVCZ) is interposed between the liquid crystal film and the transparent electrode, information can be immediately written in the form of an optical image. A device provided with the optical-image-writing means is shown in FIG. 4. Referring to the figure, a part 60 corresponds to the storage medium into which the composite element of the present invention is assembled. Adjacent to one side of the regular ferroelectric single crystal substrate 44, the liquid crystal film 45 is formed. Further, a transparent photoconductor film is formed on the other side of the substrate 44. They are held between the glass plates 51, each being provided with the transparent electrode 52. A small electric field E is applied across the electrodes. Shown at 62 is means to write information with an optical image. The parts 42, 43, 47 and 48 are the same as in FIG. 3. Now, the substrate 44, is brought into unidirectional domains in a direction opposite to the writing field $E_w$ and an optical image is projected onto the substrate 44 by the information wiring means 62. Then, the photoconductor film 61 is rendered conductive in conformity with the optical image. The writing field $E_w$ corresponding to the optical image is directly applied to the substrate 44. Thus, partial polarization reversal arises, to effect the writing.

In the devices in FIGS. 3 and 4, erasure can be easily accomplished either by applying to the storage media, an intense field of a polarity opposite to that of the writing field or heating them above the Curie temperature of the ferroelectrics.

Since, according to the devices, writing and erasure can be easily conducted, new types of erasable optical storage media can be realized.

We claim:

1. A device for storing and optically reading out information comprising:
    a storage element having
        a regular ferroelectric single crystal substrate;
        a liquid crystal medium disposed in contact with one surface of said substrate;
    first means, connected to one surface of said substrate and said liquid medium, for applying a D.C. voltage thereacross; and
        a pair of transparent plates disposed adjacent said first means;
    second means for writing a thermal image representative of information to be stored into said substrate;
    third means for directing a light beam through said storage element to read out said image therein; and
    fourth means for applying a D.C. voltage to said first means.

2. A device according to claim 1, wherein said liquid medium is a liquid crystal made of at least one member selected from the group consisting of cholesteric liquid crystals, and nematic liquid crystals having negative dielectric anisotropy.

3. A device according to claim 2, wherein said first means comprises a pair of transparent electrodes between which a prescribed electric field is applied.

4. A device according to claim 3, wherein said third means includes respective polarizers disposed adjacent opposite sides of said storage element.

5. A device according to claim 2, wherein said regular ferroelectric single crystal substrate is made of a member selected from the group consisting of barium titanate, lithium niobate, guanidinium aluminum sulfate hexahydrate, tri-glycine sulfate, and lithium hydrogen selenite.

6. A device for optically storing information comprising:
- a storage element having
  - a regular ferroelectric single crystal substrate;
  - a liquid crystal medium disposed in contact with one surface of said substrate;
  - a photoconductive film disposed in contact with the other surface of said substrate;
  - first means, disposed on said liquid crystal medium and said photoconductive film, for applying a D.C. voltage therebetween through said substrate; and
  - a pair of transparent plates disposed adjacent said first means;
- second means for directing a beam of light, containing information to be stored onto said storage element; and
- third means for applying a D.C. voltage to said first means.

7. A device according to claim 6, wherein said liquid medium is a liquid crystal made of at least one member selected from the group consisting of cholesteric liquid crystals, and nematic liquid crystals having negative dielectric anisotropy.

8. A device according to claim 7, wherein said first means comprises a pair of transparent electrodes between which a prescribed electric field is applied.

9. A device according to claim 6, wherein said regular ferroelectric single crystal substrate is made of a member selected from the group consisting of barium titanate, lithium niobate, guanidinium aluminum sulfate hexahydrate, tri-glycine sulfate, and lithium hydrogen selenite.

10. A composite optical element comprising:
- a regular ferroelectric single crystal substrate which has a first transparent electrode on one surface thereof;
- a second transparent electrode which is disposed in proximity to said substrate on the side thereof opposite to the side on which said substrate has said first transparent electrode; and
- a liquid crystal film which is held between said substrate and said second transparent electrode and in contact with said substrate;
- said liquid crystal film being made of at least one member selected from the group consisting of cholesteric liquid crystals, and nematic liquid crystals with negative dielectric anistropy,
- said first and second transparent electrodes being applied with a D.C. voltage in order to control the direction of the spontaneous polarization of said regular ferroelectric single crystal.

11. A composite optical element according to claim 10, wherein said regular ferroelectric single crystal substrate is made of a member selected from the group consisting of barium titanate, lithium niobate, guanidinium aluminum sulfate hexahydrate, tri-glycine sulfate, and lithium hydrogen selenite.

12. A composite optical element according to claim 10, wherein a first transparent plate is disposed in contact with said first transparent electrode on the side thereof opposite to the side on which said first transparent electrode is in contact with said substrate, and a second transparent plate is disposed in contact with said second transparent electrode on the side thereof opposite to the side on which said second transparent electrode is in contact with said liquid crystal film.

13. A composite optical element according to claim 12, wherein said regular ferroelectric single crystal substrate is made of a member selected from the group consisting of barium titanate, lithium niobate, guanidinium aluminum sulfate hexahydrate, tri-glycine sulfate, and lithium hydrogen selenite.

14. A composite optical element comprising:
- a transparent photoconductor film which has a first transparent electrode on one surface thereof;
- a regular ferroelectric single crystal substrate which is disposed in contact with said photoconductor film on the side thereof opposite to the side on which said photoconductor film has said first transparent electrode;
- a second transparent electrode which is disposed in proximity to said substrate on the side thereof opposite to the side on which said substrate is in contact with said photoconductor film; and
- a liquid crystal film which is held between said substrate and said second transparent electrode and in contact with said substrate;
- said liquid crystal film being made of at least one member selected from the group consisting of cholesteric liquid crystals, and nematic liquid crystals with negative dielectric anisotropy;
- said first and second transparent electrodes being applied with a D.C. voltage in order to control the direction of the spontaneous polarization of said regular ferroelectric single crystal.

15. A composite optical element according to claim 14, wherein said regular ferroelectric single crystal substrate is made of a member selected from the group consisting of barium titanate, lithium niobate, guanidinium aluminum sulfate hexahydrate, tri-glycine sulfate, and lithium hydrogen selenite.

16. A composite optical element according to claim 14, wherein a first transparent plate is disposed in contact with said first transparent electrode on the side opposite to the side on which said first transparent electrode is in contact with said photoconductor film, and a second transparent plate is disposed in contact with said second transparent electrode on the side opposite to the side on which said second transparent electrode is in contact with said liquid crystal film.

17. A composite optical element according to claim 16, wherein said regular ferroelectric single crystal substrate is made of a member selected from the group consisting of barium titanate, lithium niobate, guanidinium aluminum sulfate hexahydrate, tri-glycine sulfate, and lithium hydrogen selenite.

* * * * *